July 8, 1941.  W. A. BAGLEY  2,248,601
CONTROL EQUIPMENT FOR PRIME MOVER ELECTRIC GENERATING PLANTS
Filed Oct. 8, 1940
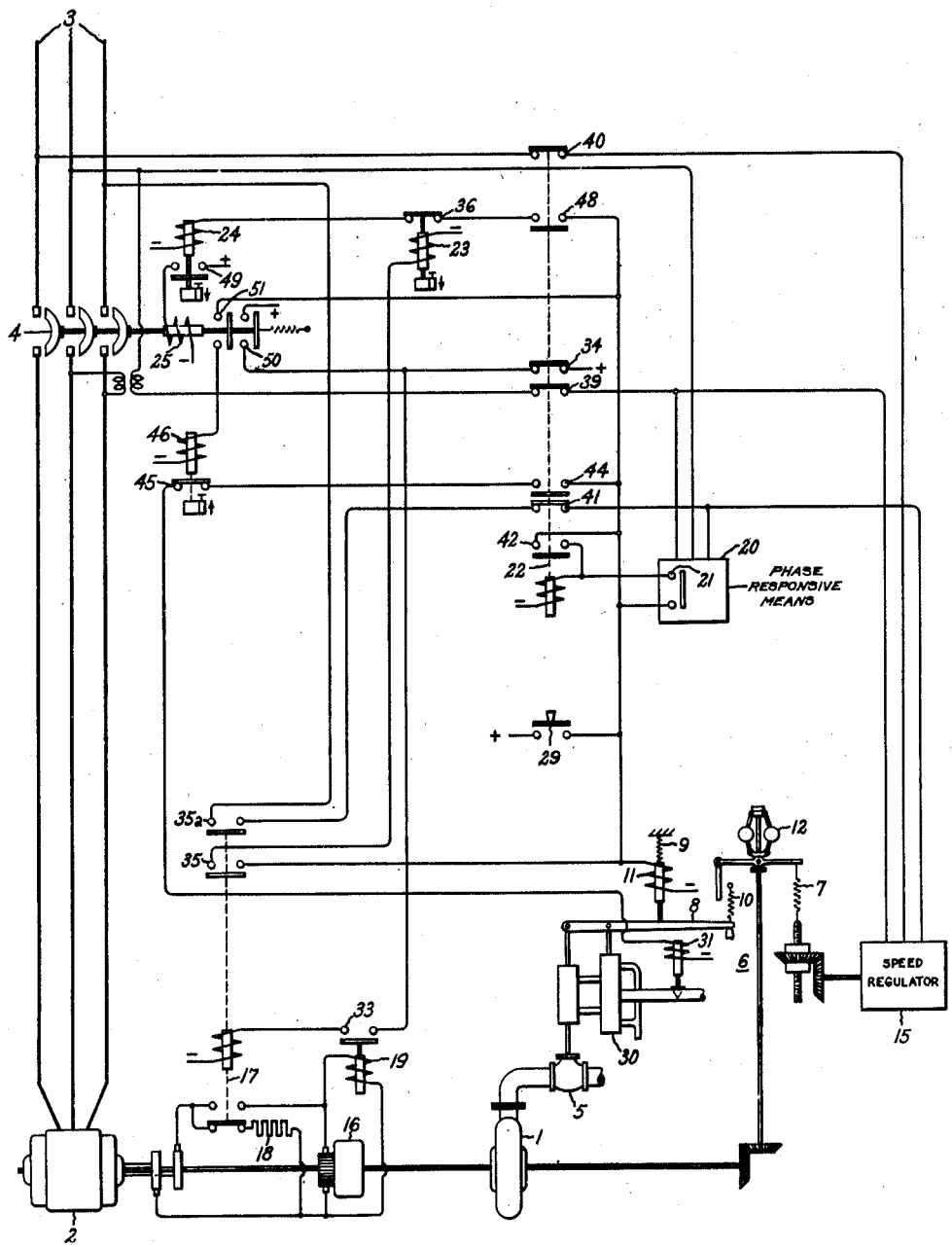
Inventor:
William A. Bagley,
by Harry E. Dunham
His Attorney.

Patented July 8, 1941

2,248,601

UNITED STATES PATENT OFFICE 2,248,601

CONTROL EQUIPMENT FOR PRIME MOVER ELECTRIC GENERATING PLANTS

William A. Bagley, Boston, Mass., assignor to General Electric Company, a corporation of New York Application October 8, 1940, Serial No. 360,251

11 Claims. (Cl. 290—4)

My invention relates to control equipments for prime mover electric generating plants and particularly to an equipment for controlling the paralleling of a prime mover driven alternating current synchronous generator.

It is common practice to parallel an alternating current synchronous generator by first connecting the generator to the alternating current system while the generator excitation is below a value which will cause the generator to pull into synchronism and then increasing the excitation to a value which is sufficient to pull the generator into synchronism. Satisfactory paralleling of the generator by such an arrangement depends upon the connection of the generator and the increase in the generator excitation occurring at the proper generator speed. When such a paralleling arrangement is used to parallel the synchronous generator in an automatic hydroelectric plant, the acceleration rate of the prime mover and generator is often too fast, during starting, to obtain the best paralleling results.

One object of my invention is to provide an improved paralleling arrangement for a prime mover driven alternating current synchronous generator so that the paralleling operation always occurs under the proper speed condition.

In accordance with my invention, I excite the generator and regulate the prime mover speed in response to the generator and system voltages prior to paralleling so as to maintain the difference between the generator and electric system frequencies as small as possible. When the frequency difference is below a predetermined value and a predetermined phase relation exists between the voltages of the generator and the electric system, I then initiate the paralleling operation. In the particular embodiment of my invention shown the paralleling operation is effected by reducing the generator field excitation below the synchronizing value, then connecting the generator to the system, and then reapplying sufficient excitation to pull the generator into step. In order to prevent any change in the generator frequency during the synchronizing operation, especially in plants where the speed governor is driven by a motor connected to the generator of the plant, it may be desirable in some instances to provide suitable means for preventing any change in the position of the valve controlling the supply of fluid to the prime mover from the time the paralleling operation is initiated until after the generator has been connected to the system for a predetermined time.

Such a control arrangement requires as a paralleling device merely a relatively inexpensive relay which maintains its contacts closed during a predetermined phase range of the generator and system voltages when the frequency difference is below a predetermined value.

My invention will be better understood from the following description when taken in connection with the accompanying drawing, the single figure of which diagrammatically illustrates a control arrangement for a prime mover electric generating plant embodying my invention, and the scope of my invention will be pointed out in the appended claims.

Referring to the drawing, 1 represents a prime mover driving a polyphase generator 2 which is arranged to be connected to an energized polyphase circuit 3 by means of a suitable circuit breaker 4. The prime mover 1 is supplied with operating fluid through a valve 5 which is maintained in a position dependent upon the speed of the prime mover 1 by means of a flyball governor 6, the flyballs 12 of which are driven in any suitable manner at a speed proportional to the speed of the prime mover and operate against the tension of an adjustable spring 7. The position of the flyballs 12 of the flyball governor 6 controls the position of the movable member 8 which in turn controls the opening position of the valve 5. As diagrammatically shown in the drawing, the movable member 8 is in its valve closed position and is held in that position by a closing spring 9 against the bias of an opening spring 10 as long as a governor magnet 11 is deenergized. When it is desired to start the prime mover 1, it is necessary to energize the governor magnet 11, which is so arranged that its energization moves the closing spring 9 out of operative relation with the movable member 8 and allows the opening spring 10 to move the movable member 8 to a valve opening position. While the governor magnet 11 is energized, the gate-opening position of the member 8 depends upon the position of the flyballs 12 of the governor 6, and this position of the flyballs 12 for any given speed of the prime mover may be varied by changing the tension of the adjustable spring 7 in any suitable manner. In the particular embodiment shown the tension of the spring 7 is changed during the starting operation of the prime mover 1 in response to the difference between the frequencies of the generator 2 and the system 3 so as to maintain the frequency difference as small as possible. A speed-regulating arrangement, which is particularly adapted for use in the embodiment of my invention shown in the drawing, is disclosed in detail in United States Letters Patent 1,843,788 which is assigned to the assignee of this application. Therefore, in order to simplify the present disclosure, I have illustrated the speed regulating arrangement merely by a rectangle 15, since my present invention does not relate to the details thereof.

An exciter 16, which may be of any suitable type, is provided for supplying exciting current to the field winding of the generator 2. As shown, the exciter 16 is a dynamo-electric machine driven by the prime mover 1 and is arranged to be connected to the field winding of the generator 2 by the field switch 17 when in its closed position. When in its open position, the field switch 17 connects the discharge resistor 18 across the terminals of the field winding of the generator 2. The closing of the field switch 17 is effected during the starting operation of the plant as soon as the exciter voltage builds up to a sufficient value to effect the operation of a voltage relay 19 which is connected across the terminals of the exciter 16.

For initiating the paralleling operation in response to a predetermined phase relation between the voltages of the generator 2 and the circuit 3, I provide a suitable phase responsive means 20 which may be of the type disclosed in detail in United States Letters Patent 2,168,175 granted to the assignee of this application. Since my present invention does not relate to the details of the phase responsive means, I have represented such means merely by a square 20 and a set of contacts 21 in order to simplify the present disclosure. The closing of the contacts 21 effects the operation of an associated control relay 22 which in turn removes the speed regulator 15 and the phase responsive means 20 from the control of the voltages of the generator 2 and the circuit 3 and effects the opening of the field switch 17. After the switch 17 has remained open for a sufficient length of time to allow the generator voltage to decrease below a predetermined subnormal value, the time relay 23, the operation of which is initiated by the opening of the field switch 17, completes an energizing circuit for a control relay 24 which in turn completes an energizing circuit for the closing coil 25 to close the circuit breaker 4 in order to connect the generator 2 to the circuit 3. Also the closing of the circuit breaker 4 effects the subsequent closing of the field switch 17 so that the generator excitation is restored to a value sufficient to pull the generator into synchronism.

For controlling the starting and stopping of the prime mover plant, I provide a manually controlled switch 29 which is closed when it is desired to start the plant and which is opened when it is desired to shut down the plant.

In order to prevent any change in the position of the gate 5 during the synchronizing operation, I provide in the inlet pipe of the regulating valve 30 for the valve 5 a normally open magnet valve 31 and provide means for energizing the magnet valve to hold the regulating valve in a desired position during the synchronizing operation. In the particular arrangement shown, this result is accomplished by controlling the circuit of the magnet valve 31 so that it is completed in response to the energization of the control relay 22 and is opened after the circuit breaker 4 has remained closed for a predetermined time.

The operation of the embodiment of my invention shown in the drawing is as follows:

When it is desired to start up the plant, the control switch 29 is closed so as to complete an energizing circuit for the governor magnet 11 which moves the closing spring 9 out of operative relation with the movable member 8 of the governor 6 so that the opening spring 10 moves the member 8 in a direction to effect the opening of the valve 5. As soon as the prime mover starts to rotate and has accelerated to a predetermined speed, the flyballs 12 operate to control, in a well-known manner, the position of the member 8.

As soon as the exciter voltage builds up to a predetermined value, the exciter voltage relay 19 closes its contacts 33 and completes through contacts 34 of relay 22 an energizing circuit for the closing coil of the field switch 17 so that normal excitation is applied to the generator field winding, and the generator voltage builds up to substantially its normal value. The closing of the auxiliary contacts 35 of the field switch 17 completes, through the contacts of the control switch 29, an energizing circuit for the control relay 23 so that it opens its contacts 36 in the energizing circuit of the control relay 24. The auxiliary contacts 35a of the field switch 17 together with the contacts 39, 40 and 41 of the control relay 22 establish the necessary connections for the speed regulator 15 and the phase responsive means 20 so that they are controlled by the frequency difference and the phase relation of the voltages of the generator 2 and the circuit 3. The speed regulator 15 operates in response to the difference between the frequencies of the generator 2 and the circuit 3 to adjust the governor setting in a well known manner so as to decrease the frequency difference and the phase responsive means 20 operates to close the contacts 21 at a predetermined phase angle between the voltages of the generator 2 and the circuit 3 when the frequency difference is below a predetermined value.

As soon as the frequency difference and the phase relation of the voltages are such that the contacts 21 are closed, a circuit is completed, through the contacts of the control switch 29, for the control relay 22. The closing of the contacts 42 of the control relay 22 completes a shunt circuit around the contacts 21 so that the relay 22 remains energized as long as the control switch 29 remains closed. The opening of the contacts 34 of the control relay 22 interrupts the circuit of the closing coil of the field switch 17 so that the field switch opens and disconnects the generator field winding from the exciter 16. The opening of the contacts 39, 40 and 41 of the control relay 22 disconnects the speed regulator 15 and the phase responsive means 20 from the generator 2 and the circuit 3. The closing of the contacts 44 of the control relay 22 completes through the normally closed contacts 45 of the control relay 46 an energizing circuit for the magnet 31 so that the position of the valve 5 cannot be changed by the flyballs 12 during synchronizing operation.

After the field switch 17 has been opened long enough to allow the generator voltage to decrease below its synchronizing value, time relay 23, the circuit of which is opened by the contacts 35 of the field switch 17, closes its contacts 36 and completes through contacts 48 of the relay 22 and the contacts of the control switch 29 an energizing circuit for the control relay 24. By closing its contacts 49, the control relay 24 completes an energizing circuit for the closing coil 25 of the circuit breaker 4 so that the generator 2 is connected to the circuit 3. The closing of the auxiliary contacts 50 of the circuit breaker 4 completes through contacts 33 of the exciter voltage relay 19 an energizing circuit for the closing coil of the field switch 17 so that the generator excitation is restored to its normal value in order to pull the generator into synchronism with the circuit 3. The closing of the auxiliary contacts 51 of the circuit breaker 4 completes through contacts of the control switch 29 an energizing circuit for the operating winding of the time relay 46. After the circuit breaker 4 has been closed for a predetermined time, relay 46 opens its contacts 45 in the energizing circuit of the magnet valve 31 so that the gate 5 may then be adjusted in any suitable manner to cause the prime mover plant to assume its share of the load connected to the circuit 3.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. An arrangement for synchronizing an alternating current generator with an alternating current system comprising means for furnishing to the field winding of said generator an excitation of a desired value about its synchronizing value, means dependent upon the relative frequencies of the voltages of said system and generator for regulating the speed of said generator to reduce the frequency difference, and means responsive to a predetermined phase relation between said voltage when the frequency difference is below a predetermined value for decreasing the excitation of said generator below its synchronizing value and then connecting said generator to said system and then increasing the excitation of said generator to a synchronizing value.

2. An arrangement for synchronizing an alternating current generator with an alternating current system comprising means supplying sufficient excitation to said generator to produce substantially normal generator voltage, means dependent upon the relative frequencies of the voltages of said generator and system for regulating the speed of said generator to reduce the frequency difference, and means responsive to a predetermined phase relation between said voltages when the frequency difference is below a predetermined value for decreasing the excitation of said generator below its synchronizing value and then connecting said generator to said system and then restoring the excitation of said generator to a synchronizing value.

3. An arrangement for synchronizing an alternating current generator with an alternating current system comprising means supplying sufficient excitation to said generator to produce substantially normal generator voltage, means dependent upon the relative frequencies of the voltages of said generator and system for regulating the speed of said generator to reduce the frequency difference, and means responsive to a predetermined phase relation between said voltages when the frequency difference is below a predetermined value for rendering said speed regulating means inoperative and for effecting a decrease in the excitation of said generator to a value below the syncronizing value and then the connection of said generator to said system and then an increase in the excitation to a synchronizing value.

4. An arrangement for synchronizing an alternating current generator with an alternating current system comprising a source of excitation connected to the field winding of said generator, means dependent upon the relative frequencies of the voltages of said generator and system for regulating the speed of said generator to reduce the frequency difference, and means responsive to a predetermined phase relation between said voltages when the frequency difference is below a predetermined value for disconnecting said source of excitation from the generator field winding and then connecting the unexcited generator to said system and then reconnecting said source of excitation to the generator field winding.

5. An arrangement for synchronizing an alternating current generator with an alternating current system comprising a source of excitation connected to the field winding of said generator, means dependent upon the relative frequencies of the voltages of said generator and system for regulating the speed of said generator to reduce the frequency difference, and means responsive to a predetermined phase relation between said voltages when the frequency difference is below a predetermined value for rendering said speed regulating means inoperative and for effecting the disconnection of said source of excitation from the generator field winding and then the connection of the unexcited generator to said system and then the reconnection of said source of excitation to the generator field winding.

6. In combination, an energized alternating current system, an alternating current generator, switching means for connecting said generator to said system, a source of excitation, a field switch connecting said source to the field winding of said generator, means dependent upon the relative frequencies of the voltages of said generator and system for regulating the speed of said generator to reduce the frequency difference, means responsive to a predetermined phase relation between said voltage when the frequency difference is below a predetermined value for opening said field switch, timing means responsive to the opening of said field switch for effecting the operation of said switching means, and means responsive to the operation of said switching means for reclosing said field switch.

7. In combination, an energized alternating current system, an alternating current generator, switching means for connecting said generator to said system, a source of excitation, a field switch connecting said source to the field winding of said generator, means dependent upon the relative frequencies of the voltages of said generator and system for regulating the speed of said generator to reduce the frequency difference, means responsive to a predetermined phase relation between said voltages when the frequency difference is below a predetermined value for rendering said speed regulating means inoperative and for opening said field switch, timing means responsive to the opening of said field switch for effecting the operation of said switching means, and means responsive to the operation of said switching means for reclosing said field switch.

8. In combination, an energized alternating current system, an alternating current generator, a prime mover driving said generator, a source of fluid pressure, valve means for controlling the supply of fluid pressure from said source to said prime mover, switching means for connecting said generator to said system, a source of excitation, a field switch connecting said source of excitation to the field winding of said generator, means dependent upon the relative frequencies of the voltages of said generator and system for controlling the position of said valve means to reduce the frequency difference, means responsive to a predetermined phase relation between said voltages when the frequency difference is below a predetermined value for rendering said speed regulating means inoperative and for maintaining said valve means in a predetermined position and for effecting the opening of said field switch, means for effecting the operation of said switching means after said field switch is opened, and means responsive to the operation of said switching means for reclosing said field switch.

9. In combination, an energized alternating current system, an alternating current generator, a prime mover driving said generator, a source of fluid pressure, valve means for controlling the supply of fluid pressure from said source to said prime mover, switching means for connecting said generator to said system, a source of excitation, a field switch connecting said source of excitation to the field winding of said generator, means dependent upon the relative frequencies of the voltages of said generator and system for controlling the position of said valve means to reduce the frequency difference, means responsive to a predetermined phase relation between said voltages when the frequency difference is below a predetermined value for rendering said speed regulating means inoperative and for maintaining said valve means in whatever position it is in and for effecting the opening of said field switch, means for effecting the operation of said switching means after said field switch is opened, and means responsive to the operation of said switching means for reclosing said field switch and for releasing said valve means.

10. In combination, an energized alternating current system, an alternating current generator, a prime mover driving said generator, a source of fluid pressure, valve means for controlling the supply of fluid pressure from said source to said prime mover, switching means for connecting said generator to said system, a source of excitation, a field switch connecting said source of excitation to the field winding of said generator, means for effecting the opening of said field switch and then the operation of said switching means and then the closing of said field switch, and means for controlling said valve means in one manner while said field switch is closed and in a different manner while said field switch is open.

11. In combination, an energized alternating current system, an alternating current generator, a prime mover driving said generator, a source of fluid pressure, valve means for controlling the supply of fluid pressure from said source to said prime mover, switching means for connecting said generator to said system, a source of excitation, a field switch connecting said source of excitation to the field winding of said generator, means for effecting the opening of said field switch and then the operation of said switching means and then the closing of said field switch, means for controlling said valve means in response to the relative frequencies of the voltage of said generator and system when said field switch is open and said generator is disconnected from said system, and means for controlling said valve means so as to prevent an increase in the generator speed while said field switch is open.

WILLIAM A. BAGLEY.